United States Patent
Joo et al.

(10) Patent No.: US 7,006,479 B1
(45) Date of Patent: Feb. 28, 2006

(54) SYSTEM AND METHOD OF A WIRELESS NETWORK OPERATION AND MAINTENANCE

(75) Inventors: Ki-Hyun Joo, San Jose, CA (US); Chol Su Kang, Fremont, CA (US); Jay Wu Hong, San Jose, CA (US); Choi Young, II, Seoul (KR)

(73) Assignee: Cisco Technology, Inc., San Jose, CA (US)

( * ) Notice: Subject to any disclaimer, the term of this patent is extended or adjusted under 35 U.S.C. 154(b) by 638 days.

(21) Appl. No.: 09/724,812

(22) Filed: Nov. 28, 2000

(51) Int. Cl.
*H04Q 7/24* (2006.01)

(52) U.S. Cl. .............. 370/338; 370/335; 370/328; 713/201

(58) Field of Classification Search ........... 370/352, 370/401, 338; 709/219
See application file for complete search history.

(56) References Cited

U.S. PATENT DOCUMENTS

| | | | |
|---|---|---|---|
| 5,602,843 A | 2/1997 | Gray | 370/338 |
| 5,771,275 A | 6/1998 | Brunner et al. | 379/67 |
| 5,796,729 A | 8/1998 | Greaney et al. | 370/345 |
| 5,818,824 A | 10/1998 | Lu et al. | 370/328 |
| 5,970,059 A | 10/1999 | Ahopelto et al. | 370/338 |
| 6,014,377 A | 1/2000 | Gillespie | 370/351 |
| 6,073,029 A | 6/2000 | Smith et al. | 455/555 |
| 6,167,040 A | 12/2000 | Haeggstrom | 370/352 |
| 6,223,055 B1 | 4/2001 | Cyr | 455/555 |
| 6,243,581 B1 | 6/2001 | Jawanda | 455/432 |
| 6,314,284 B1 | 11/2001 | Patel et al. | 455/417 |
| 6,317,609 B1 | 11/2001 | Alperovich et al. | 455/556 |
| 6,411,632 B1 | 6/2002 | Lindgren et al. | 370/466 |
| 6,424,638 B1 | 7/2002 | Ray et al. | 370/331 |
| 6,535,732 B1 * | 3/2003 | McIntosh et al. | 455/445 |
| 6,651,190 B1 * | 11/2003 | Worley et al. | 714/43 |
| 6,687,243 B1 * | 2/2004 | Sayers et al. | 370/356 |
| 6,754,227 B1 | 6/2004 | Petersen et al. | 370/467 |
| 6,876,747 B1 | 4/2005 | Faccin et al. | 380/247 |
| 2002/0010865 A1 * | 1/2002 | Fulton et al. | 713/201 |

* cited by examiner

*Primary Examiner*—Frank Duong
*Assistant Examiner*—Michael J. Moore
(74) *Attorney, Agent, or Firm*—Baker Botts L.L.P.

(57) ABSTRACT

A wireless office communication system including a multi-protocol wireless internet base station (WIBS) encompassing a base station controller, a mobile switch controller and an ethernet interface module for coupling the WIBS to an existing internet protocol (IP) based network. The interface module provides for coupling the WIBS to an ethernet back-bone, a mobile communication unit and a public switch telephone network (PSTN). In one embodiment of the invention, a maintenance and operation server is coupled to the ethernet back-bone to allow a technician to remotely call into the enterprise system from a mobile system such as a lap-top computer or a personal digital assistant (PDA) to perform typical system operations and maintenance functions via the internet.

19 Claims, 4 Drawing Sheets

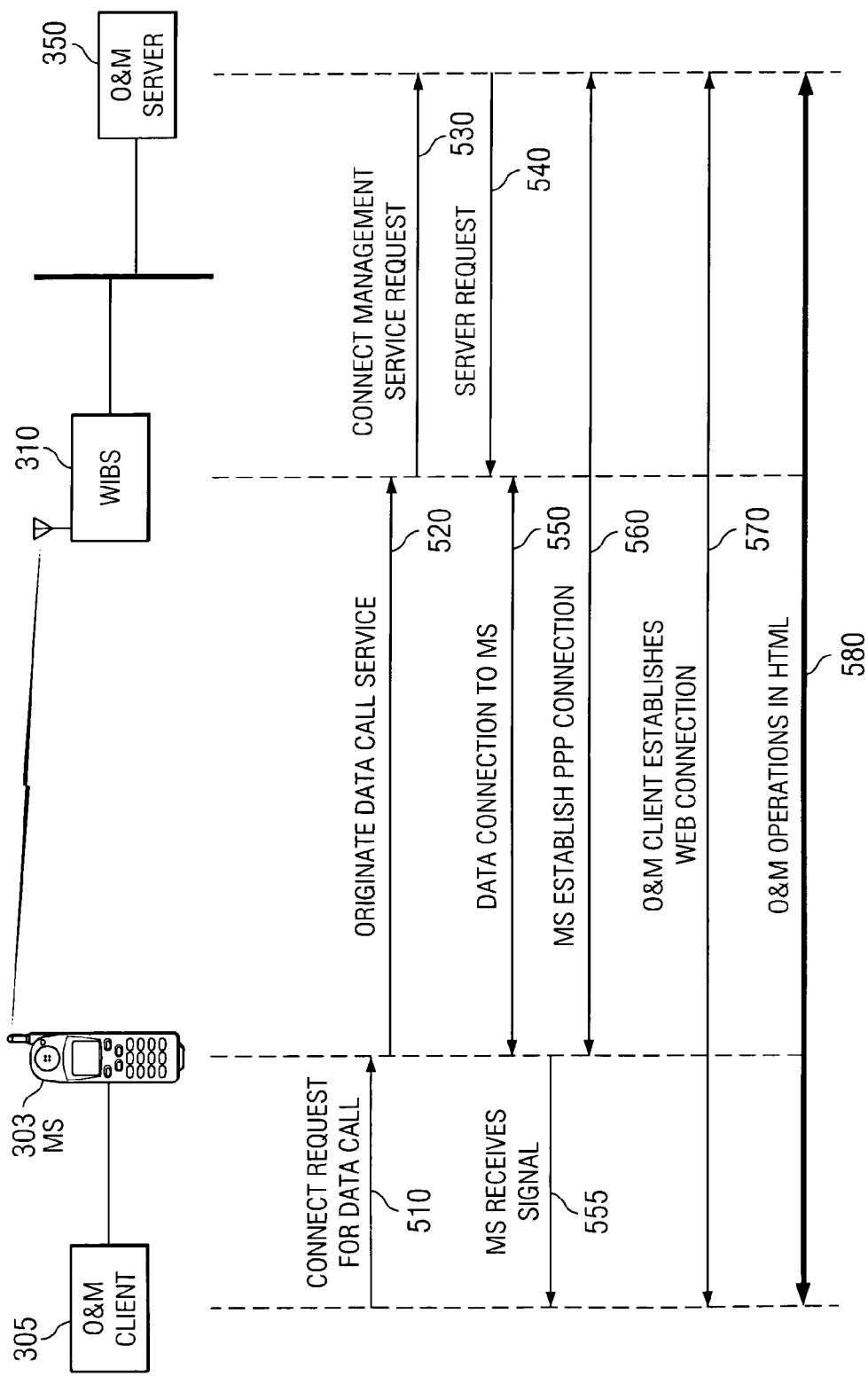

SYSTEM AND METHOD OF A WIRELESS NETWORK OPERATION AND MAINTENANCE

FIELD OF THE INVENTION

The present claimed invention relates generally to the field of wireless communication systems. More particularly, the present claimed invention relates to the remote operation and maintenance of a packet based wireless base station which interfaces with Call Agents using a wireless signaling protocol.

BACKGROUND ART

Local area networks such as Ethernet are well known. Most local area networks are wired, so that each station is connected directly or indirectly to all other stations by cabling or wires, thus providing full connectivity between all stations. Such local area networks avoid collisions and achieve efficient use of the communications channel by well known carrier sensing and collision avoidance schemes. Such schemes are typically not suitable for wireless networks. Communication systems that utilize coded communication signals are also well known in the art. One such system is a code division multiple access (CDMA) cellular communication system such as set forth in the Telecommunications Industry Association/Electronic Industries Association International Standard (TIA/EIA IS-95), hereinafter referred to as IS-95.

FIG. 1 is an illustration of a conventional prior art CDMA system. In the system shown in FIG. 1, base stations 110 and 120 are connected to a base station controller 130 and a mobile switching controller 140 which is in turn connected to the public switched telephone network (PSTN) 150 and a public land mobile network (PLMN) 160 using known techniques.

In the system shown in FIG. 1, when a communication unit (CU) 105, 107, or 106 initiates a call sequence to either one of the base stations 110 and 120 within a coverage area, an end-to-end connection is established between the respective base stations, the base station controller 130 and the MSC 140 using known CDMA call setup techniques. The base stations 110 and 120 typically communicate with the BSC 130 and the MSC 140 via communication links, such as a T1 connection. Base stations 110 and 120 typically have antennas to define the coverage area within which either base stations primarily accommodate the communication units.

With the proliferation of wireless devices in the office and school environment, the communication system shown in FIG. 1 can be very expensive if implemented in an office or in-building environment. The system in FIG. 1 also has the inherent problem of wireless voice and data signal quality degradation if implemented in an in-building environment.

To alleviate the problems of the system shown in FIG. 1 and with the advent of enterprise based wireless networks, some prior art CDMA systems implement the system shown in FIG. 2. FIG. 2 includes a plurality of clients, a plurality of base transceiver stations 201, 202, 203, and a set of base station controllers 110 and 120, which are coupled to O&M sever 210 and a mobile switching center 140. O&M server 210 is coupled to O&M clients 215 and 220. In the system illustrated in FIG. 2, a wireless base station is connected to existing ethernet network infrastructure to enable the CDMA system to utilize existing internet protocol techniques to allow communication between wireless devices connected to the ethernet network.

The system in FIG. 2 utilizes a combination of wireless signaling protocol and media gateway protocol to allow wireless call handling and other multi-media data transmission. A wireless signaling protocol is necessary in order to handle mobile terminals. Communications on the LAN is implemented between requestors of information (clients) and providers of the information (servers) via a communication protocol such as a Transmission Control Protocol (TCP).

Despite the robustness of the system in FIG. 2 in an in-building wireless environment, there are some disadvantages which characterize such systems and other prior art CDMA systems when it comes to the maintenance and operation of such systems.

First, in these conventional systems such as that in FIG. 2, the method of operating and maintaining of the wireless network is by connecting an operation and maintenance server(s) to the wireless network using either SS7, X.25 or other LAN connections. In these systems, a operation and maintenance center is equipped with operation and maintenance servers with associated operation and maintenance tools. Access to the servers is limited to operations and maintenance client systems which are physically connected to the network.

Due to the mobility constraints of such systems, a technician is required to be stationed in the O&M center to physically monitor the operation of the network. With the proliferation and advances of the internet and intranets, some O&M clients can be remotely connected to the O&M servers to handle the required network management of these systems. As accessibility to the internet from remote locations continues to become more widely available and convenient, utilizing the internet to perform such tasks such as remote system operation and maintenance becomes increasingly desirable. Some methods have been developed in the prior art to allow for such remote access management. However, such methods require access to the O&M server via a Call Agent connected to the network. Processing O&M server calls through the Call Agent can be time consuming, cumbersome and take Call Agent resources away from conventional mobile devices accessing the network.

Thus, it is desirable to have a system and a method for handling remote access requests to a CDMA wireless enterprise system for system operation and maintenance management. There is a further desire to have a system for transmitting CDMA calls including voice and data over a communication pathway with a higher bandwidth such as the internet. It is further desirable to have a CDMA system that handles the transmission of calls, especially data calls, without the inherent difficulties of using a variety of transmission protocols for the same call. A need further exists for improved and less costly systems which improve efficiency and the transmission rate and time of calls between a mobile unit and a base station and between base stations and a base station controller and between adjacent base stations.

SUMMARY OF INVENTION

The present invention is directed to a system and a method for providing an enterprise in-building or campus-wide IP based code division multiple access (CDMA) wireless system. The present invention is capable of handling both voice and data transmission over an internet protocol local access network within the CDMA system without the inherent delays and signal quality degradation encountered by conventional CDMA systems. The present invention further provides a system and method of providing a remote wireless operation and system maintenance of a wireless enterprise system by utilizing existing internet protocol and communication language.

Embodiments of the invention include a system for a wireless base station which couples to existing local area networks (LAN) within an enterprise to provide remote access to a mobile wireless client which may be used to perform routine system operation and maintenance management. The base station further includes call processing determination logic which handles the decision of directing mobile calls received by the base station to either a call agent attached to the LAN or a operation and maintenance server which is also attached to the LAN.

In one embodiment of the present invention the base station and operation and maintenance server negotiate to set a predefined number to allow a mobile operation and maintenance client to call into the enterprise system. The mobile operation and maintenance call number is also dynamically negotiated and set by the base station and the operation and maintenance server in order to allow multiple operation and maintenance clients to call into the enterprise system.

In order to handle mobile operation and maintenance clients, the operation and maintenance server includes call processing logic which enables the server to perform call agent like functions. This allows the mobile operation and maintenance client to call into the enterprise system and allow a technician to perform typical operations and maintenance functions without having to be physically tied to the operation and maintenance server. The ability to perform call agent like functions by the operation and maintenance server is not available in the prior art.

The present invention further provides an implementation advantage over the prior art by allowing inter network communication between the wireless office communication system of the present invention and other mobile networks on the public land mobile network. The inter-networking communication of the present invention is implemented over an IP LAN using the ethernet transport protocol of UDP/IP or TCP/IP transport protocol via an ethernet interface to the ethernet back-bone of the system. The use of the ethernet interface is less costly than the prior art and further allows easy and flexible connectivity to existing in-office, building or campus networks.

These and other objects and advantages of the present invention will no doubt become obvious to those of ordinary skill in the art after having read the following detailed description of the preferred embodiments which are illustrated in the various drawing figures.

BRIEF DESCRIPTION OF THE DRAWINGS

The accompanying drawings, which are incorporated in and form a part of this specification, illustrates embodiments of the invention and, together with the description, serve to explain the principles of the invention:

Prior Art

FIG. 5 is a block diagram of an embodiment of the call message flow from a wireless operation and maintenance client to a operation and maintenance server of the present invention.

DESCRIPTION OF THE PREFERRED EMBODIMENTS

Reference will now be made in detail to the preferred embodiments of the invention, examples of which are illustrated in the accompanying drawings. While the invention will be described in conjunction with the preferred embodiments, it will be understood that they are not intended to limit the invention to these embodiments.

On the contrary, the invention is intended to cover alternatives, modifications and equivalents, which may be included within the spirit and scope of the invention as defined by the appended claims. Furthermore, in the following detailed description of the present invention, numerous specific details are set forth in order to provide a thorough understanding of the present invention. However, it will be obvious to one of ordinary skill in the art that the present invention may be practiced without these specific details. In other instances, well known methods, procedures, components, and circuits have not been described in detail as not to unnecessarily obscure aspects of the present invention.

The invention is directed to a system, an architecture, subsystem and method to manage a wireless CDMA data communication in a way superior to the prior art. In accordance with an aspect of the invention, a base station allows CDMA call coverage within a building without requiring a dedicated and a lengthy end-to-end transmission.

In the following detailed description of the present invention, a system and method for a wireless internet protocol based communication system is described. Numerous specific details are not set forth in order to provide a thorough understanding of the present invention. However, it will be recognized by one skilled in the art that the present invention may be practiced without these specific details or with equivalents thereof.

Generally, an aspect of the invention encompasses providing an integrated wireless internet protocol based in-building or campus-wide CDMA communication system which provides a wide range of voice, data, video and other services in conjunction with a private branch exchange interfaced to the Public Switched Telephone Network (PSTN) and the Public Land Mobile Network (PLMN). The invention can be more fully described with reference to FIGS. 3 through 5.

Figure 3:
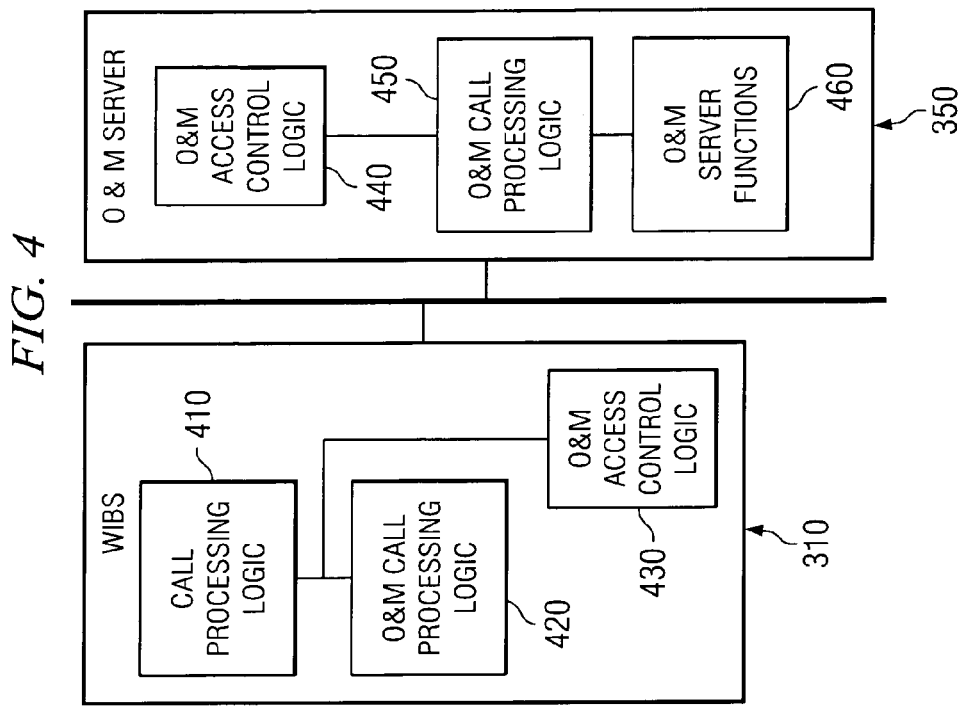
FIG. 3 is a block diagram of a remote wireless CDMA operation and maintenance system of the present invention.

FIG. 3 is a functional illustration of the wireless system of the present invention. Wireless System 300 (WS) comprises, one or more mobile or wireless communication units 303, a plurality of enterprise wireless base stations (WIBS) 310–318, a Call Agent 320 coupled to an ethernet backbone of the LAN 301, a public switch telephone network gateway 330 (PSTN) which further couples to the Public Switch Telephone Network 324, an internet/intranet gateway 340 which couples to the internet 342 and an enterprise intranet 343 and an operations and maintenance server 350.

In the system illustrated in FIG. 3, a remote access wireless operation and maintenance client 305 couples to WS 300 via any of the wireless base stations to provide a operation and maintenance management technician access to the operation and maintenance server 350. The maintenance technician may access the WS 300 by using well known internet browsers to login into the enterprise system.

In order to enable a wireless operation and maintenance management functions, wireless client software which is running on a mobile terminal 305 establishes a data link (either an Asynchronous or Packet date link) to the operations and maintenance server 350 via one of base stations 310–318. In the present invention mobile terminal unit 305 may be a personal digital assistant (PDA) with wireless connectivity, a notebook computer connected to a mobile phone, a web-enable mobile phone or any wireless computer system.

To establish the data link to the operations and maintenance server 350, mobile unit 305 transmits an access request to either of the WIBS 310–318. The access request is in the form of a unique operations identification number which is predetermined and pre-negotiated between the operations and maintenance server 350 and the base station. The operation identification number is a numerical digit of a predetermined length which may be dynamically updated between the base stations and the operations and maintenance server as part of the operation and maintenance server's managed information base.

Anyone of base stations 310–318 which receives an O&M server call request from mobile unit 305 initiates a data call setup procedure with the operations and maintenance server 350 rather than with the Call Agent 320. After a data call has been established between the mobile unit 305 and server 350, a point to point protocol session is established between terminal 305 and server 350. The Point-to-Point Protocol session enables terminal 305 to establish a data link connection to the O&M server to allow communication (e.g. the transfer of operational commands and instructions) between the wireless O&M client and the server 350. The Point-to-Point Protocol provides data-link connection and typically has the IP protocol running on top of it.

Once the Point-to-Point Protocol session is established, terminal 305 is able to initiate and establish a HTTP session to server 350 to access to the maintenance and operation tools in server 350 MIB and function as if the operations and maintenance client running on terminal 305 is directly connected to LAN 301. Thus, all operations typically performed by client 352 is now performed by client 305.

Figure 1:
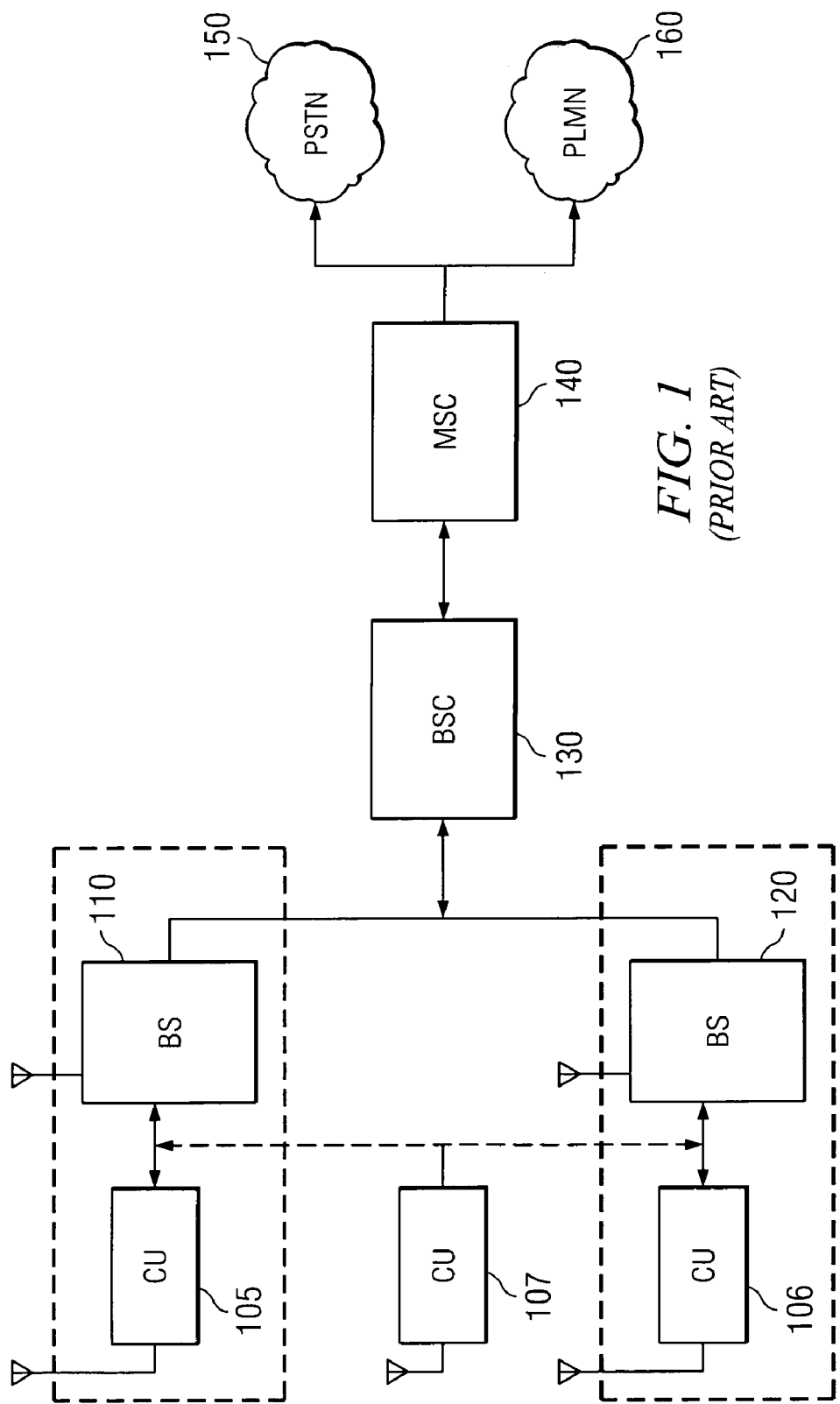
FIG. 1 is a block diagram of a conventional code division multiplex access (CDMA) system.
Figure 2:
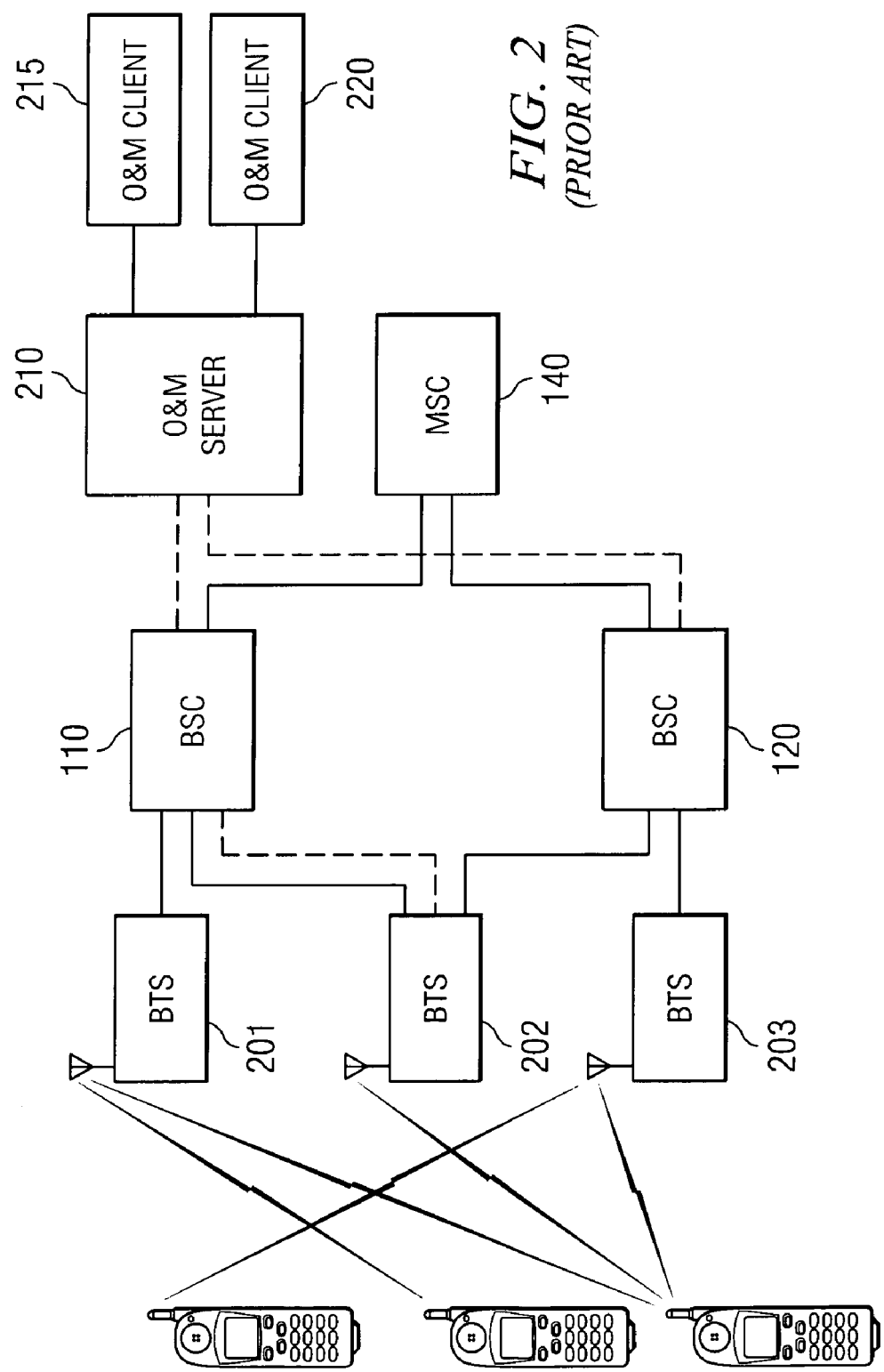
FIG. 2 is a block diagram of an implementation of a prior art enterprise CDMA system.
Figure 4:
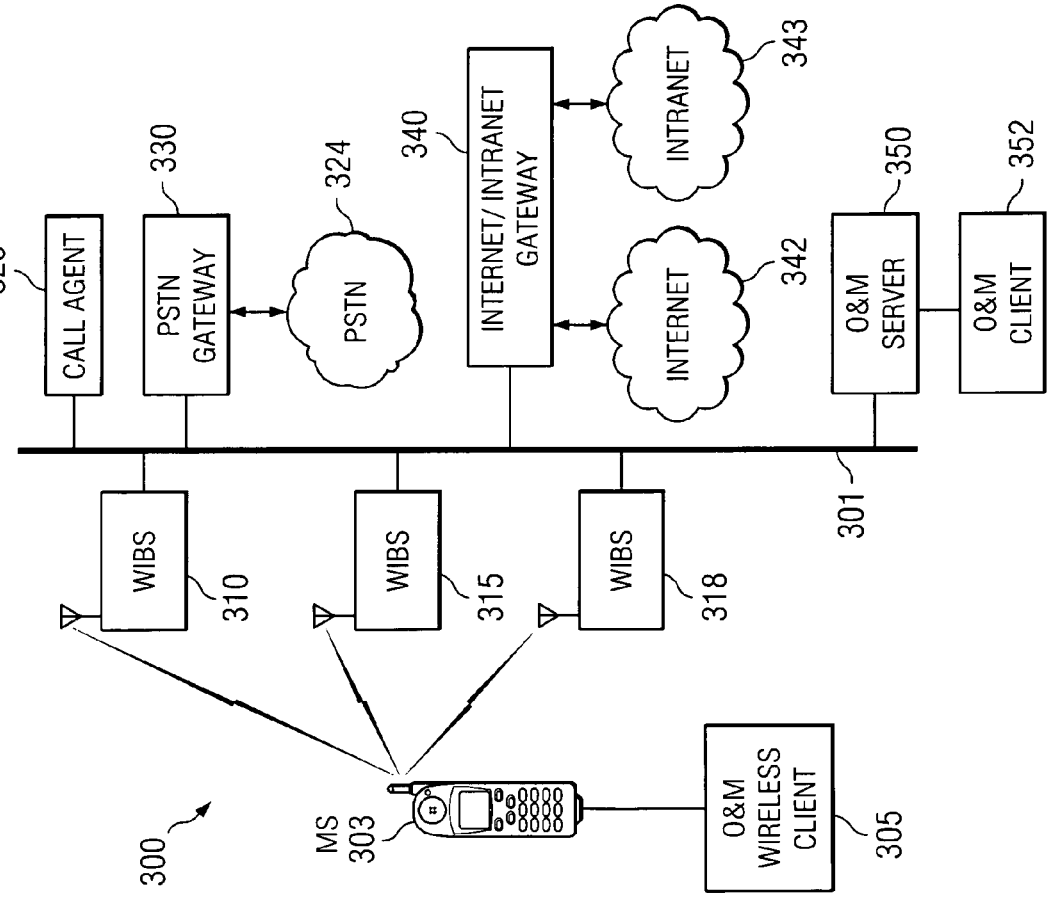
FIG. 4 is a block diagram of an embodiment of a wireless base station and a operation and maintenance server of the present invention.

Referring now to FIG. 4, a block diagram of an embodiment of the WIBS 310 and O&M server 350 is provided. As shown in FIG. 4, WIBS 310 includes call processing logic unit 410, O&M call processing logic 420 and O&M access control and logic unit 430. Call processing logic 410 is coupled to receive non-O&M wireless call requests intended for Call Agent 320 (FIG. 3) via WIBS 310 for typical CDMA wireless call functions.

Call processing logic 410 performs call processing functions which typically would have been performed by Call Agent 320. By having call processing logic 410 in the O&M server, the O&M server ensures routing of non-operation and maintenance calls to Call Agent 320.

O&M call processing logic 420 is coupled to receive O&M calls from O&M wireless clients to access the O&M server 350. In the preferred embodiment O&M call processing logic is able to determine whether to access the O&M server 350 by using a unique call identification number which is provided by Call access control unit 430. Call access control unit 430 is coupled to negotiate with the O&M server 350 unique call identification numbers which would allow remote O&M wireless clients to directly access the O&M server 350. In the preferred embodiment, the call identification number is a alphanumeric number (e.g., #3333) which is pre-determined between the O&M server and the base station and is stored in the O&M server's managed information base.

In the present invention, call access control logic 430 is capable of dynamically negotiating with the O&M server 350 to set an access number which only allows remote access to the O&M server 350 by remote wireless O&M client systems. Control logic 430 is also capable of negotiating a pre-determined access code which is stored in WIBS 310 to allow WIBS 310 to determine whether an incoming call request is to be sent to the O&M server 350 or to Call Agent 320.

Still referring to FIG. 4, O&M server 350 includes access control logic unit 440, call processing logic unit 450 and O&M function logic unit 460. Access control logic unit 440 performs similar function as access control logic unit 430. O&M call processing logic 450 negotiates with WIBS 310 to set dynamically or statically the access code for wireless O&M clients to access the O&M server 350.

Call processing logic 450 is coupled to provide call processing functions to the O&M server 350. Having a call processing logic in the O&M server is a novel way of having the O&M server provide call agent like functions which the prior art does not provide. Processing logic unit 450 also provides the O&M server 350 call processing capabilities to ensure that O&M client calls do not compete with other conventional mobile calls to the enterprise system.

Calls processed by call processing logic 450 are handed-off to O&M server functions logic 460 which grants remote access processing of O&M functions and tools to the O&M remote client. O&M server functions logic 460 also provides other typical O&M functions for O&M clients physically connected to the enterprise system.

Referring now to FIG. 5 is a sequence flow diagram of the wireless operation and maintenance operation of the present invention. The operation of present invention is initiated by a mobile operation and maintenance client issuing a connect request for a data call for wireless operation and maintenance number via request signal 510 to WIBS 310.

In the preferred embodiment, the request number may be a predetermined alphanumeric number (e.g., #3333). The mobile terminal originates a data call service option and calls the requested number by transmitting the data call request via signal 520 to the WIBS 310. When WIBS 310 detects the wireless operation and maintenance request signal it sends a connection management service request to the operation and maintenance server via request signal 530.

The operation and maintenance server 350 responds to the WIBS 310 request by establishing a data connection to the mobile terminal on a dedicated traffic channel and transmitting an acknowledgment signal via signal 540 to the WIBS 310. In response to the traffic channel signal from the operation and maintenance server, the WIBS establishes a data connection to the mobile terminal of the traffic channel at step 550 of FIG. 5 to enable the mobile terminal to communicate to the operation and maintenance server.

When the mobile terminal receives signal 555, mobile terminal establishes a Point-to-Point Protocol connection (step 560) with the operation and maintenance server to begin communications with the maintenance and operation tools. To communicate with the operation and maintenance server, the operation and maintenance running on the mobile terminal establishes a web connection with server via signal 570 and send operation and maintenance commands using HTML or other similar internet communication language at step 580 of FIG. 5.

The foregoing descriptions of specific embodiments of the present invention have been presented for purposes of illustration and description. They are not intended to be exhaustive or to limit the invention to the precise forms disclosed, and obviously many modifications and variations are possible in light of the above teaching. The embodiments were chosen and described in order to best explain the principles of the invention and its practical application, to thereby enable others skilled in the art to best utilize the invention and various embodiments with various modifications are suited to the particular use contemplated. It is intended that the scope of the invention be defined by the claims appended hereto and their equivalents.

We claim:

1. An enterprise code division multiplex access, CDMA, wireless communication system, comprising:
    a local area network (LAN);
    a plurality of wireless base stations coupled to said LAN, said wireless base stations coupled to communicate with wireless devices coupled within the enterprise wireless communication system via an Internet protocol;
    a maintenance and operations (M&O) server coupled to said LAN, said M&O server configured to handle wired and wireless M&O clients communicating to or within the enterprise wireless communication system; and
    a Call Agent coupled to said LAN to process wireless calls from mobile communication units to the enterprise wireless communication system, wherein said M&O server further includes call negotiation logic for negotiating unique call identification numbers between the M&O server and the wireless base station to enable remote wireless M&O clients to communicate with the M&O server.

2. The system as recited in claim 1, wherein said plurality of wireless base stations include wireless call processing logic configured to handle conventional wireless communication functions.

3. The system of claim 1, wherein said wireless base station further includes a wireless operation and maintenance call processing logic configured to handle wireless M&O client call requests to the M&O server.

4. The system of claim 3, wherein the wireless base station further includes call identification number negotiation logic for negotiating a unique call identification number between the M&O server and the wireless base station to enable remote wireless M&O clients to communicate with the M&O server.

5. The system of claim 3, said unique call identification number enables said wireless base station to process M&O calls without deferring processing of said calls to the Call Agent.

6. The system of claim 4, wherein said M&O server includes call processing logic for processing call requests from remote wireless M&O clients to the enterprise communication system.

7. The system of claim 1, wherein said remote wireless M&O clients access said wireless communication system via the Internet.

8. A wireless enterprise communication system providing remote access maintenance and operation functions to a plurality of remotely coupled wireless operation and maintenance (O&M) devices, said system including a plurality of base stations, each of said plurality of base stations, comprising:
    a first call processing logic unit;
    a second call processing logic unit; and
    an access control logic unit for setting a unique call identification number to enable the base station to distinguish between call requests from said wireless O&M devices and other wireless devices within the enterprise system.

9. The system of claim 8, wherein said first call processing logic processes non-operation and maintenance wireless client calls in the base station.

10. The system of claim 8, wherein said second call processing logic processes remote wireless O&M device call requests in the base station.

11. A enterprise wireless communication system, comprising:
    a maintenance and operations (M&O) server for providing wireless remote access and local operations and maintenance access to wired and wireless M&O devices;
    call processing logic in said M&O server for processing remote call requests from said remote wireless M&O devices; and
    access control logic unit in said M&O server for setting a unique call identification number in response to negotiation with a base station in order to enable said remote wireless devices to communicate with the M&O server.

12. The enterprise system of claim 11, wherein said unique call identification number is dynamically set by the access control logic unit.

13. The enterprise system of claim 11, wherein said access control logic unit statically sets the unique call identification number.

14. The enterprise system of claim 11, wherein said unique identification number allows only said remote wireless M&O devices to transmit operation and maintenance call requests to the enterprise system.

15. In a wireless enterprise communication system having a plurality of wireless base stations, a maintenance and operations (M&O) server for facilitating maintenance and operation functions and a plurality of remote wireless M&O client systems coupled to wireless mobile devices, a method of remotely accessing said M&O server by said wireless M&O client systems, comprising the steps of:
    a) providing a unique call identification number;
    b) accepting call requests from said wireless clients to remotely access said M&O server;
    c) determining whether said call requests from said wireless clients are valid requests;
    d) initiating a remote call processing to said M&O server; and
    e) granting remote access to said wireless M&O client to access said M&O server, wherein said step a) includes a step of negotiating between said wireless base station and said M&O server to dynamically set a call identification number to enable said M&O client initiate calls to the enterprise system.

16. The method of claim 15, wherein said step c) includes a step of establishing a data connection communication path between said base station and said M&O client via said mobile device.

17. The method of claim 15, wherein said step c) further includes a step of establishing a data connection communication path between said base station and said M&O server to handle call processing requests in response to maintenance and operation requests from said M&O client.

18. The method of claim 15, wherein said step d) includes a step of establishing a point-to-point communication path between the mobile device and the M&O server.

19. The method of claim 18, wherein said step d) further includes a step of establishing an internet connection between said M&O client and M&O server to allow said M&O client to utilize an internet communication language to communicate with said M&O server.

* * * * *

UNITED STATES PATENT AND TRADEMARK OFFICE
CERTIFICATE OF CORRECTION

PATENT NO. : 7,006,479 B1
APPLICATION NO. : 09/724812
DATED : February 28, 2006
INVENTOR(S) : Ki-Hyun Joo et al.

Page 1 of 1

It is certified that error appears in the above-identified patent and that said Letters Patent is hereby corrected as shown below:

Face page, (75) Inventors: delete "Choi Young, Il" and insert --Young Il Choi--.

Signed and Sealed this

Fifteenth Day of April, 2008

JON W. DUDAS
*Director of the United States Patent and Trademark Office*